US010802296B2

(12) United States Patent
Chen et al.

(10) Patent No.: US 10,802,296 B2
(45) Date of Patent: Oct. 13, 2020

(54) OPTICAL LENS FOR VISION CORRECTION

(71) Applicants: ST. SHINE OPTICAL CO., LTD., New Taipei (TW); APP VISION CARE, INC., Taipei (TW)

(72) Inventors: Ming-Hsien Chen, New Taipei (TW); Yu-Jan Chou, New Taipei (TW); Chiu-Hsien Tsan, New Taipei (TW); Shang-Jen Huang, Taipei (TW)

(73) Assignee: ST. SHINE OPTICAL CO., LTD., New Taipei (TW)

( * ) Notice: Subject to any disclaimer, the term of this patent is extended or adjusted under 35 U.S.C. 154(b) by 202 days.

(21) Appl. No.: 16/040,812

(22) Filed: Jul. 20, 2018

(65) Prior Publication Data

US 2019/0064542 A1 Feb. 28, 2019

(30) Foreign Application Priority Data

Aug. 28, 2017 (TW) ............... 106129178 A

(51) Int. Cl.
*G02C 7/04* (2006.01)
*G02C 7/02* (2006.01)
*G02C 7/06* (2006.01)

(52) U.S. Cl.
CPC .............. *G02C 7/044* (2013.01); *G02C 7/06* (2013.01); *G02C 7/024* (2013.01); *G02C 2202/24* (2013.01)

(58) Field of Classification Search
CPC .................................. G02C 7/044; G02C 7/06
USPC .................................................. 351/159.42
See application file for complete search history.

(56) References Cited

U.S. PATENT DOCUMENTS

| 6,288,846 B1 * | 9/2001 | Stoner, Jr. ................ G02B 1/06 351/159.68 |
| 2012/0212696 A1 * | 8/2012 | Trajkovska ....... G02F 1/133753 349/123 |

FOREIGN PATENT DOCUMENTS

| CN | 101268406 A | 9/2008 |
| CN | 101681027 A | 3/2010 |
| CN | 105388628 A | 3/2016 |

OTHER PUBLICATIONS

Search Report appended to an Office Action issued to Chinese counterpart application No. 201710948263.9 by the CNIPA dated Oct. 21, 2019, with an English translation thereof.
Search Report appended to an Office Action issued to Taiwanese counterpart Application No. 106129178 by the TIPO dated May 16, 2018.

\* cited by examiner

*Primary Examiner* — James R Greece
(74) *Attorney, Agent, or Firm* — J. A. Lindeman & Co. PLLC

(57) ABSTRACT

An optical lens for vision correction includes a first image fusion area centered on a visual axis (L) of the eye (E) of a user and including a plurality of first dioptric portions randomly arranged around the first image fusion area and fused to have a first diopter (N), and a second image fusion area connected to and surrounds the first image fusion area and including a plurality of second dioptric portions randomly arranged around the second image fusion area and fused to have a second diopter (M). The first diopter |N| is smaller than the second diopter |M|. The longest width of each of the first and second dioptric portions relative to the visual axis (L) is smaller than 200 nanometers.

5 Claims, 9 Drawing Sheets

OPTICAL LENS FOR VISION CORRECTION

CROSS-REFERENCE TO RELATED APPLICATION

This application claims priority of Taiwanese Patent Application No. 106129178, filed on Aug. 28, 2017.

FIELD

The disclosure relates to an optical lens, more particularly to an optical lens for vision correction.

BACKGROUND

The vision imaging problem of some common pathological conditions of the eye, such as myopia (nearsightedness), hyperopia (farsightedness) or presbyopia, is resolved through an optical lens. For example, in myopia, refraction of parallel rays passing through a refraction system of the eye will converge or focus in front of the retina and cannot form a clear image on the retina, so that a person with myopia cannot clearly see when looking at a far distance. To correct this condition, a concave lens is placed in front of the user's eye to correct the imaging position, so that a clear image can be formed on the retina.

In hyperopia, the image falls behind the retina, but the refractive system of the eye will carry out the adjustment, so that the image will fall on the retina when looking at a near object. However, after a correction lens is worn, this will lead to burden of the eye when looking far or near, especially, the lens of the refractive system often needs to deform, thereby causing the eye to fatigue and age.

In order to meet the demands of looking far and near, some optical lenses in the market take multifocal configurations. But the serious problem of image jump easily exists in this method, so that the user often accompanied by each blink of an eye, and because the image does not fall on the retina, has a blurred vision. In order to be able to see the object clearly again, adjustment must be made on the eyes, that is, the ciliary muscle must be contracted and the lens of the refractive system must be prolonged or shortened so as to permit the image to fall back on the retina. However, the lens of the refractive system is overly adjusted and used, so that the user is prone to have the feeling of eye fatigue.

SUMMARY

Therefore, an object of the present disclosure is to provide an optical lens for vision correction that is capable of overcoming the aforesaid drawback of the prior art.

Accordingly, an optical lens for vision correction of this disclosure includes a first image fusion area and a second image fusion area. The first image fusion area is centered on a visual axis (L) of the eye (E) of a user, and includes a plurality of first dioptric portions randomly arranged around the first image fusion area and fused to have a first diopter (N). The second image fusion area is connected to and surrounds the first image fusion area. The second image fusion area includes a plurality of second dioptric portions randomly arranged around the second image fusion area and fused to have a second diopter (M). The absolute value of the first diopter |N| is smaller than the absolute value of the second diopter |M|. The longest width of each of the first and second dioptric portions relative to the visual axis (L) is smaller than 200 nanometers.

BRIEF DESCRIPTION OF THE DRAWINGS

Other features and advantages of the disclosure will become apparent in the following detailed description of the embodiments with reference to the accompanying drawings, of which.

DETAILED DESCRIPTION

Figure 1:
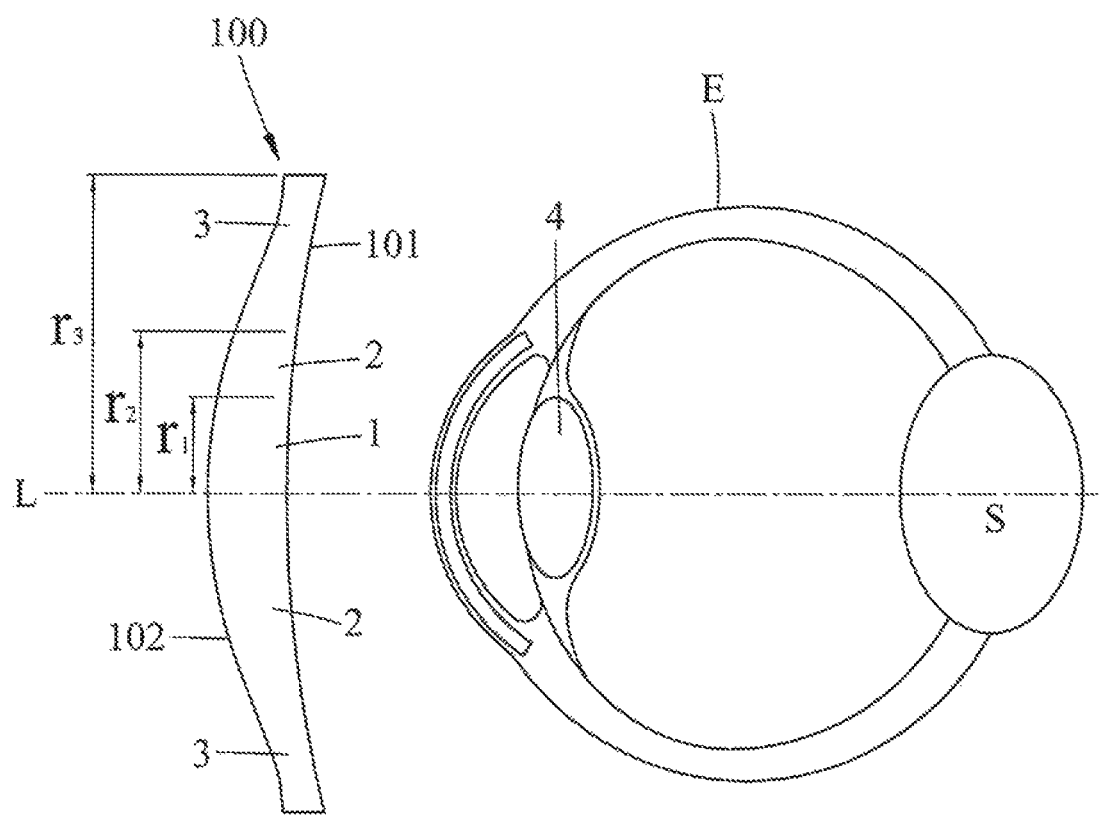
FIG. 1 is a schematic view of an optical lens for vision correction according to the first embodiment of this disclosure prior to being worn on an eye of a user.

Before the disclosure is described in greater detail, it should be noted herein that like elements are denoted by the same reference numerals throughout the disclosure.

Figure 2:
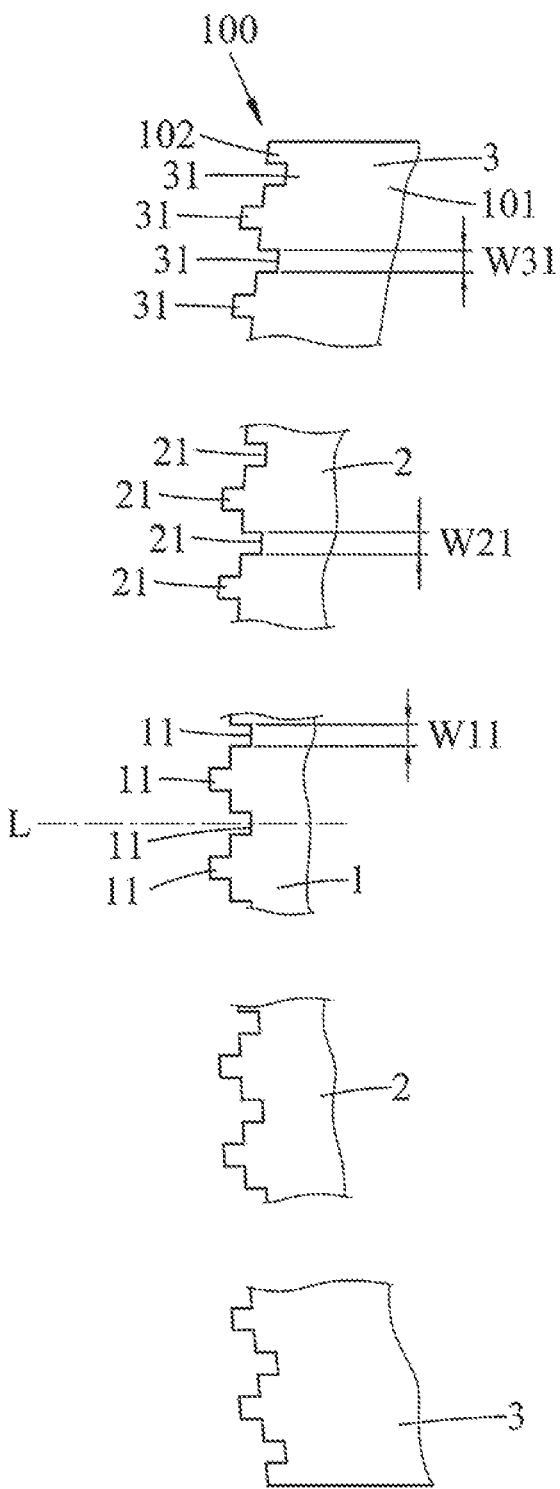
FIG. 2 is an enlarged fragmentary schematic view of the first embodiment.

Referring to FIGS. 1 and 2, the first embodiment of an optical lens 100 for vision correction according to the present disclosure is configured to be worn by a user in need of a vision correction in diopter (P). It is worth to mention herein that the diopter (P) has a positive value and a negative value. It is known in the art that if the value of the diopter (P) of a lens is positive, it is used for correcting hyperopia or farsightedness, and if the value of the diopter (P) is negative, it is used for correcting myopia or nearsightedness.

The optical lens 100 of this embodiment is a contact lens having an inner side surface 101 configured to contact the eye (E) of a user, an outer side surface 102 opposite to the inner side surface 101, and a plurality of image fusion areas between the inner and outer side surfaces 101, 102. The image fusion areas include a first image fusion area 1, a second image fusion area 2, and a third image fusion area 3.

Figure 3:
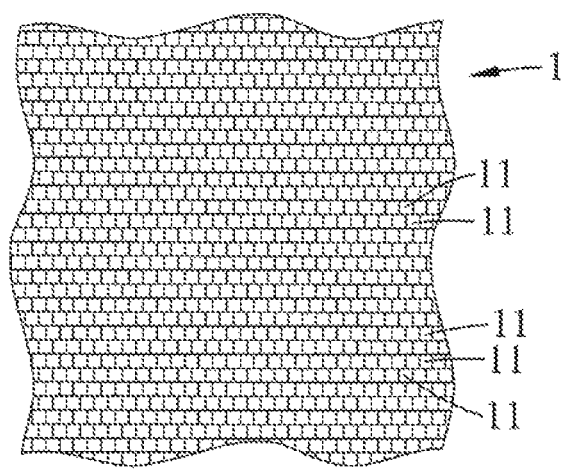
FIG. 3 is an enlarged fragmentary schematic view of a first image fusion area of the first embodiment.
Figure 4:
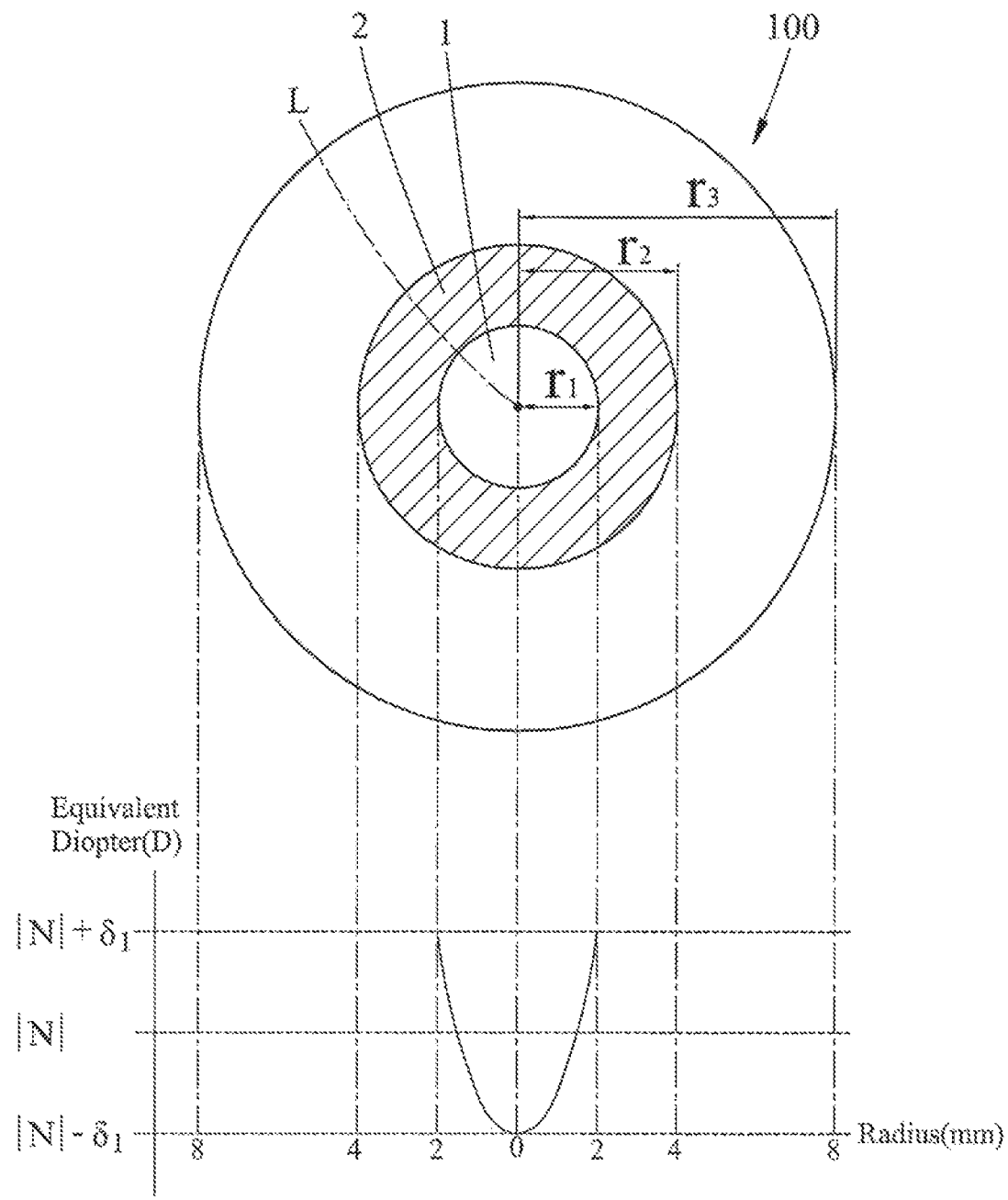
FIG. 4 is a diagram illustrating a distribution state of a first diopter of the first embodiment.

Referring to FIGS. 3 and 4, in combination with FIGS. 1 and 2, the first image fusion area 1 is centered on a visual axis (L) of the eye (E), and includes a plurality of first dioptric portions 11 randomly arranged around the first image fusion area 1 and fused to have a first diopter (N). The first diopter (N) is obtained through an optical instrument testing, and is used to allow the eye to have a stable imaging through the first diopter (N) of the first image fusion area 1. The first dioptric portions 11 have concave and convex shapes of different diopter values. The first image fusion area 1 has a radius ($r_1$) with respect to the visual axis (L) ranging from 1 mm to 2.5 mm. Each of the first dioptric portions 11 has a diopter of $N±δ_1$, where $δ_1$ is a variable value ranging from 0.25 D to 9.0 D. The longest width (W11) of each of the first dioptric portions 11, 12 is smaller than 200 nanometers. Through the difference in the variable values ($δ_1$) of the diopters of the first dioptric portions 11 and the sizes of the first dioptric portions 11, an image fusion can be effected in a certain range of the diopters of the first dioptric portions 11. The aforesaid image fusion simulates a visual perception similar to the imaging area of the first diopter (N), and can be produced in a defined range of dioptric portions. Further, the smaller the longest width (W11), the more stable is its simulation similar to the imaging area of the first diopter (N).

Figure 5:
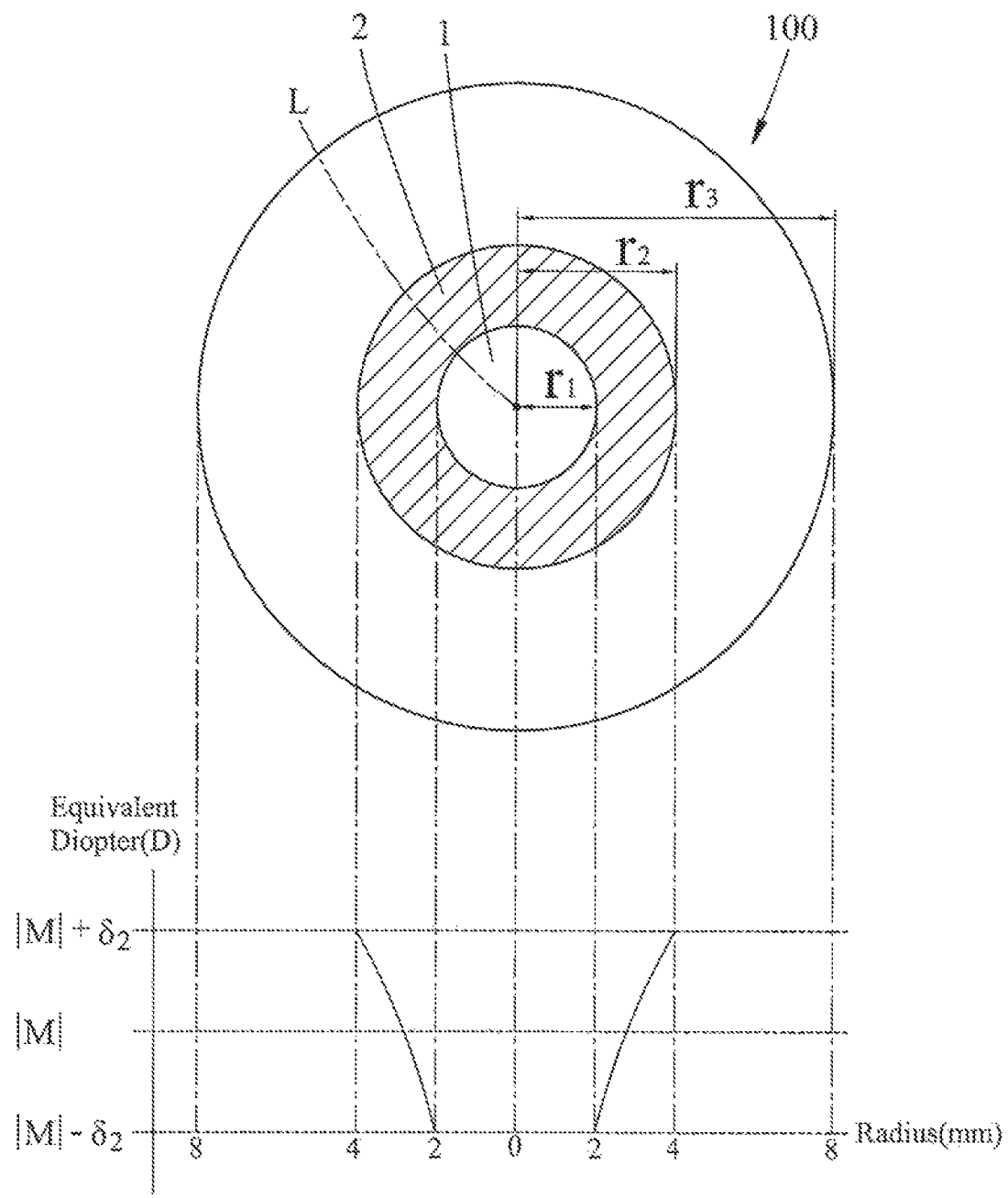
FIG. 5 is a diagram illustrating a distribution state of a second diopter of the first embodiment.

Referring to FIG. 5, in combination with FIGS. 1 and 2, the second image fusion area 2 is connected to and surrounds the first image fusion area 1, and includes a plurality of second dioptric portions 21 randomly arranged around the second image fusion area 2 and fused to have a second diopter (M). The second dioptric portions 21 have concave and convex shapes of different diopter values. The absolute value of the first diopter |N| is smaller than the absolute value of the second diopter |M|. The second image fusion area 2 has a radius ($r_2$) with respect to the visual axis (L) ranging from 1.5 mm to 4 mm. Each of the second dioptric portions 21 has a diopter of $M±δ_2$, where $δ_2$ is a variable value ranging from 0.25 D to 12.0 D. The longest width (W21) of each of the second dioptric portions 21 relative to the visual axis (L) is smaller than 200 nanometers. Through the difference in the variable values ($δ_2$) of the diopters of the second dioptric portions 21 and the sizes of the second dioptric portions 21, an image fusion can be effected in a certain range of the diopters of the second dioptric portions 21. The aforesaid image fusion simulates a visual perception similar to the imaging area of the second diopter (M), and can be produced in a defined range of dioptric portions. Further, the smaller the longest width (W21), the more stable is its simulation similar to the imaging area of the second diopter (M).

The third image fusion area 3 is connected to and surrounds the second image fusion area 2, and includes a plurality of third dioptric portions 31 randomly arranged around the third image fusion area 3 and fused to have a third diopter (O). The third dioptric portions 31 have concave and convex shapes of different diopter values. The absolute value of the third diopter |O| ranges between the absolute value of the first diopter |N| and the absolute value of the second diopter |M|. The third image fusion area 3 has a radius ($r_3$) with respect to the visual axis (L) ranging from 2 mm to 8 mm. Each of the third dioptric portions 31 has a diopter of $O±δ_3$, where $δ_3$ is a variable value ranging from 0.25 D to 12.0 D. The longest width of each of the third dioptric portions 31 relative to the visual axis (L) is smaller than 200 nanometers. Through the difference in the variable values ($δ_3$) of the diopters of the third dioptric portions 31 and the sizes of the third dioptric portions 31, an image fusion can be effected in a certain range of the diopters of the third dioptric portions 31. The aforesaid image fusion simulates a visual perception similar to the imaging area of the second diopter (M), and can be produced in a defined range of dioptric portions. Further, the smaller the longest width (W21), the more stable is its simulation similar to the imaging area of the second diopter (M).

In this embodiment, because the inner side surface 101 is used for abutting against the eye, the first, second and third dioptric portions 11, 21, 31 are distributed around the outer side surface 102.

Table 1 below demonstrates multiple experiments on the diopter configuration data range of the optical lens 100 of this disclosure. The relationship among the first diopter (N), the second diopter (M) and the third diopter (O) of optical lenses with different corrected diopters (P) are illustrated.

TABLE 1

| # | Corrected Diopter P (Unit: D) | N (Unit: D) | M (Unit: D) | O (Unit: D) | $N ± δ_1$ (Unit: D) | $M ± δ_2$ (Unit: D) | $O ± δ_3$ (Unit: D) |
|---|---|---|---|---|---|---|---|
| 1 | −2.0 | −1.5 | −2.5 | −2.0 | 0~−2.0 | −0.5~−03.0 | −0.5~−2.5 |
| 2 | −3.0 | −2.5 | −3.5 | −3.0 | −0.5~−3.25 | −1.0~−4.25 | −1.0~−4.0 |
| 3 | −4.0 | −3.25 | −5.0 | −4.0 | −1.0~−4.25 | −2.25~−6.0 | −1.75~−5.25 |
| 4 | −5.0 | −4.0 | −6.5 | −5.0 | −1.5~−5.25 | −3.5~−7.75 | −2.5~−6.5 |
| 5 | −6.0 | −4.25 | −7.5 | −6.0 | −1.75~−5.75 | −4.25~−9.0 | −3.5~−7.75 |
| 6 | −7.0 | −4.5 | −8.5 | −7.0 | −1.75~−5.5 | −5.25~−9.0 | −4.25~−8.25 |
| 7 | −8.0 | −5.5 | −9.5 | −8.0 | −2.5~−6.0 | −6.25~−10.5 | −5.0~−9.25 |
| 8 | 2.0 | 1.5 | 2.5 | 2.0 | 0~2.0 | 0.5~3.5 | 0.5~2.5 |
| 9 | 3.0 | 2.0 | 3.2 | 3.0 | 0.5~2.5 | 1.0~4.0 | 0.5~3.0 |
| 10 | 4.0 | 3.0 | 5.5 | 3.75 | 1.0~2.75 | 1.75~6.75 | 2.0~3.75 |
| 11 | 5.0 | 3.5 | 7.5 | 5.0 | 1.5~3.75 | 3.25~9.25 | 3.0~7.5 |
| 12 | 6.0 | 4.0 | 8.25 | 6.0 | 1.75~5.5 | 3.5~7.5 | 3.5~8.0 |
| 13 | 7.0 | 4.25 | 9.0 | 6.75 | 2.0~6.0 | 4.5~8.25 | 4.25~8.5 |
| 14 | 8.0 | 5.0 | 9.5 | 8.25 | 2.5~6.5 | 6.5~10.25 | 5.5~9.25 |

With reference to FIGS. 2, 4 and 5, the fused first diopter (N) and the fused second diopter (M) are configured gradually. That is, the diopters increase or decrease as the area gets closer to the visual axis (L). Whether or not to configure the third diopter (O) depends on whether the radius of the third image fusion area 3 with respect to the visual axis (L) is lower than 4 mm or not. If it is greater than 4 mm, because it is beyond the visible area of a normal eye, there is no need to fuse the third image fusion area 3. It is only necessary to continue a continuous concave surface along the second image fusion area 2, for example, configured a stable −8.0 D. Through this, referring again to FIGS. 1 and 2, a human eye vision imaging system forms a vision imaging correction visible area (S) located on the retina, and the eye (E) can directly make adjustment when looking far or near, so that the changes and compression deformations of the ciliary muscle and the lens of the refractive system can be minimized due to looking far or near, thereby reducing the feeling of eye fatigue.

Figure 6:
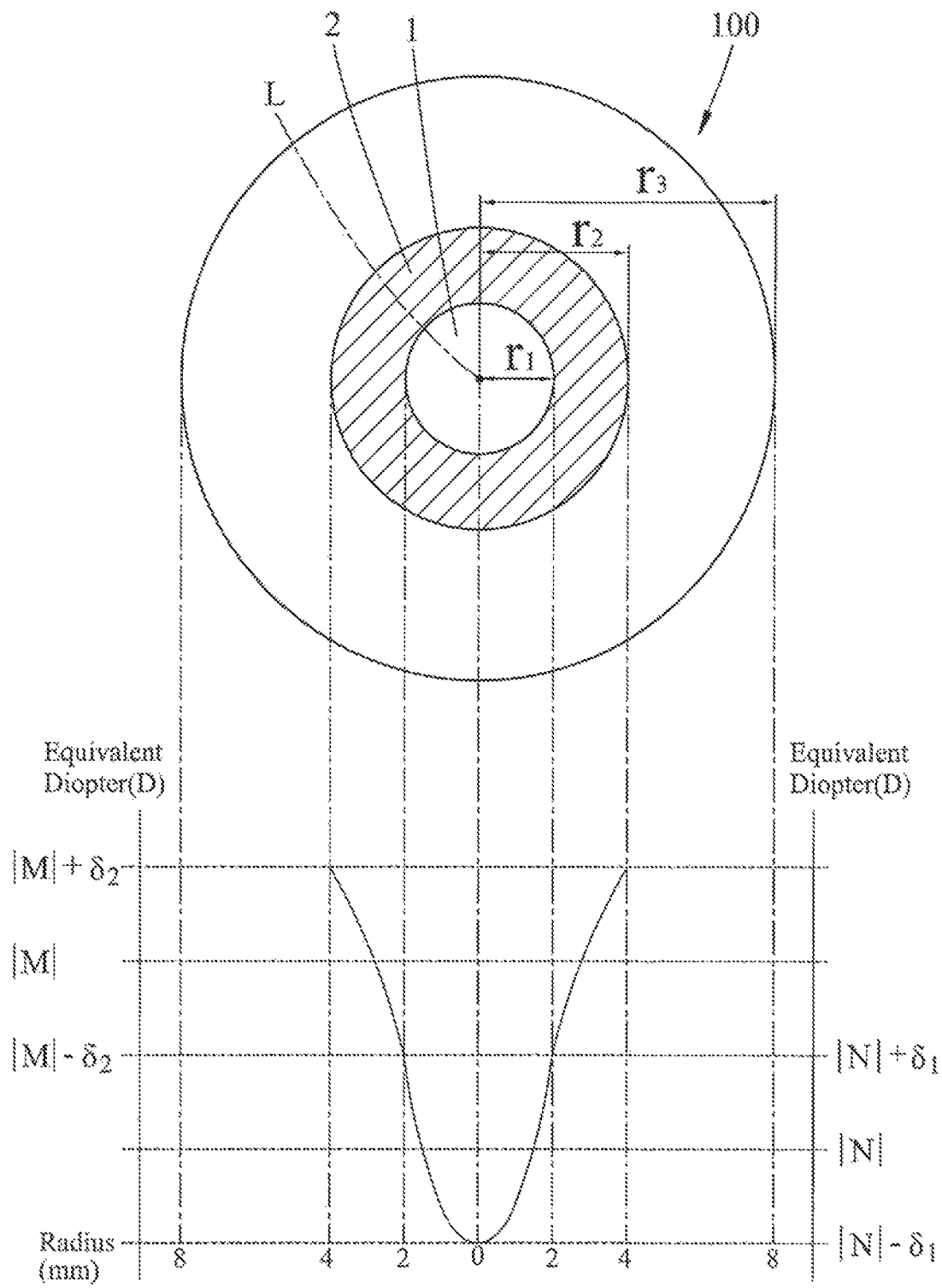
FIG. 6 is a diagram illustrating a use case of the first embodiment.

Referring to FIG. 6 and Table 2, in combination with FIGS. 1 and 2, the radius ($r_1$) of the first image fusion area 1 with respect to the visual axis (L) is 2 mm, and the radius ($r_2$) of the second image fusion area 2 with respect to the visual axis (L) is 4 mm. FIG. 6 is a diagram taken from a use case of Table 2 in which the corrected diopter value is −2.0 D. The first and second dioptric portions 11, 21 have negative diopters distributed from the visual axis (L). The maximum diopter value ($N−δ_1$) of the first image fusion area 1 is 0, while the minimum diopter value ($N+δ_1$) thereof is −2.0 D. Further, the maximum diopter value ($M−δ_2$) of the second image fusion area 2 is close to the minimum diopter value (N+$\delta_1$) of the first image fusion area 1. Thus, the change in the diopters from the visual axis (L) outwardly is a continuous curve. Similar to the foregoing effect, because the longest width of each of the first and second dioptric portions 11, 21 is smaller than 200 nanometers, an effect of vision image fusion is created, so that the human eye vision imaging system forms a vision imaging correction visible area (S) located on the retina.

TABLE 2

| # | Corrected Diopter P (Unit: D) | N (Unit: D) | M (Unit: D) | O (Unit: D) | N ± $\delta_1$ (Unit: D) | M ± $\delta_2$ (Unit: D) | O ± $\delta_3$ (Unit: D) |
|---|---|---|---|---|---|---|---|
| 1 | −2.0 | −1.5 | −2.5 | NA | 0~−2.0 | −2.0~−3.0 | NA |
| 2 | −3.0 | −2.5 | −3.5 | NA | −0.5~−3.25 | −3.25~−4.25 | NA |
| 3 | −4.0 | −3.25 | −5.0 | NA | −1.0~−4.25 | −4.25~−6.0 | NA |
| 4 | −5.0 | −4.0 | −6.5 | NA | −1.5~−5.25 | −5.25~−7.75 | NA |
| 5 | −6.0 | −4.25 | −7.5 | NA | −1.75~−5.75 | −5.5~−9.0 | NA |
| 6 | −7.0 | −4.5 | −8.5 | NA | −1.75~−5.5 | −5.5~−9.0 | NA |

Figure 7:
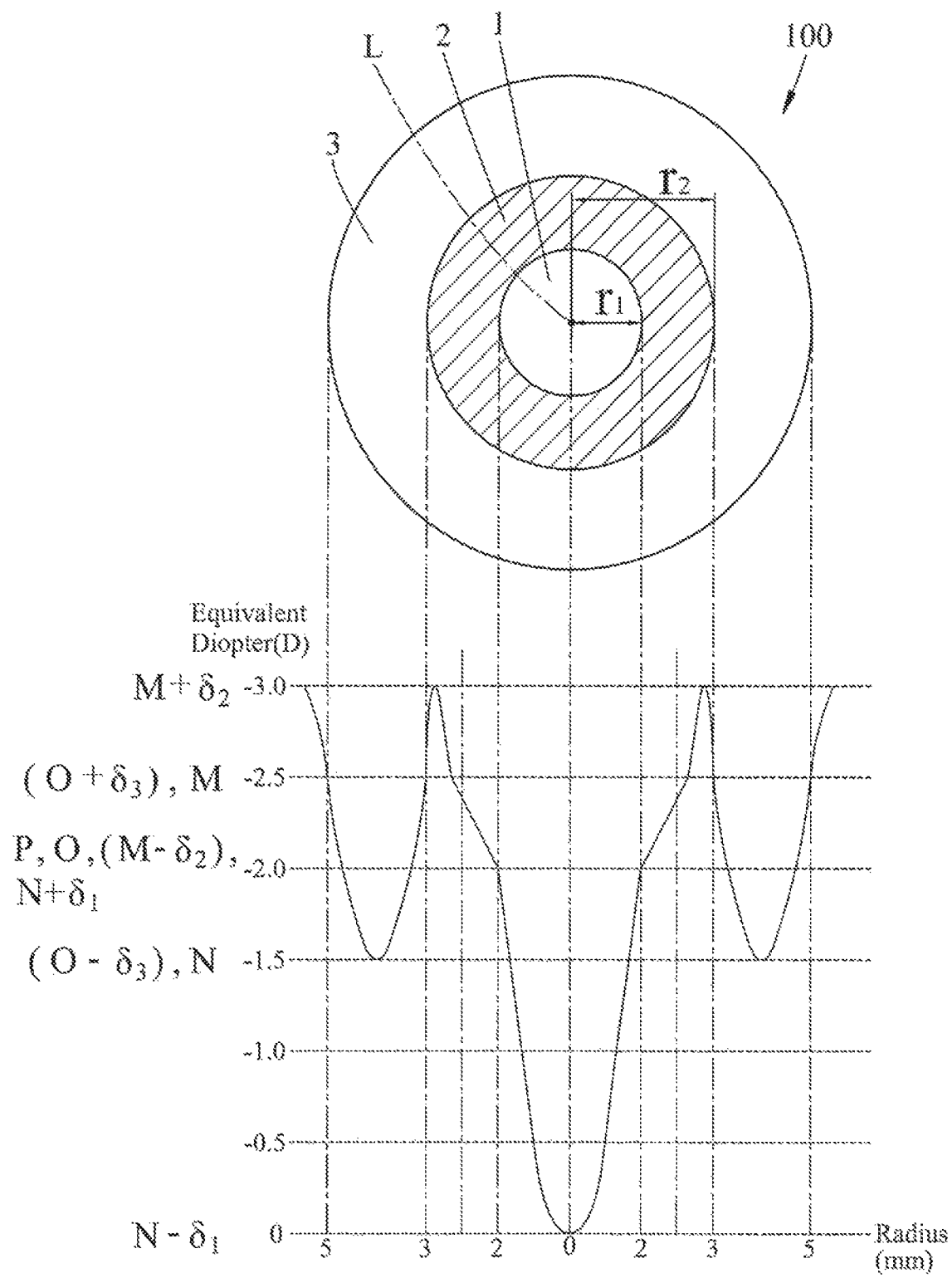
FIG. 7 is a diagram illustrating another use case of the first embodiment.

Referring to FIG. 7 and Table 3, in combination with FIGS. 1 and 2, the radius ($r_1$) of the first image fusion area 1 with respect to the visual axis (L) is 2 mm, the radius ($r_2$) of the second image fusion area 2 with respect to the visual axis (L) is 3 mm, and the radius ($r_3$) of the third image fusion area 3 with respect to the visual axis (L) is 5 mm. FIG. 7 is a diagram taken from a use case of Table 3 in which the corrected diopter value is −2.0 D. In this case, the second image fusion area 2 ranges from a radius of 2 mm to a radius of 3 mm with respect to the visual axis (L), and the third image fusion area 3 ranges from a radius of 3 mm to a radius of 5 mm with respect to the visual axis (L). Further, the maximum diopter value (N−$\delta_1$) of the first image fusion area 1 is 0, the minimum diopter value (N+$\delta_1$) of the first image fusion area 1 is −2.0 D, the maximum diopter value (M−$\delta_2$) of the second image fusion area 2 is close to the minimum diopter value (N+$\delta_1$) of the first image fusion area 1, the maximum diopter value (O−$\delta_3$) of the third image fusion area 3 is −1.5 D, and the minimum diopter value (O+$\delta_3$) of the third image fusion area 3 is −2.5 D. Thus, when entering the third image fusion area 3, the absolute value of the first diopter |N| is smaller than the absolute value of the corrected diopter |P|, the absolute value of the second diopter |M| is larger than the absolute value of the corrected diopter |P|, and the absolute value of the third diopter |O| is smaller than the absolute value of the second diopter |M| but larger than the absolute value of the first diopter |N|. Preferably, the absolute value of the third diopter |O| is substantially equal to the absolute value of the corrected diopter |P|. It should be noted herein that an area larger than 5 mm radius with respect to the visual axis (L) is not shown in FIG. 6, but in actual manufacture, the contact lens of this disclosure may extend outwardly to have a base curve of 8.0 mm.

It should be noted herein that, in order to determine whether the optical structure of the contact lens of the present disclosure is equivalent to an aspheric monofocal contact lens during use thereof, the Optometry Department of Da-Yeh University in Taiwan is commissioned to do the test, and the report of the result is given in Table 4 below. BC (base curve), Dia (diameter), PWR (power) are test values, and the target value represents the average value of the originally designed diopter. Further, the values in bold indicate the difference between the target value and the test value, but the absolute value of the difference is 0.25 D.

TABLE 4

|  | BC | Dia | PWR | Target Value |
|---|---|---|---|---|
| 4-1 | 8.50 | 14.0 | −6.00 | −6.00 |
| 4-2 | 8.55 | 14.0 | −5.50 | −6.00 |
| 4-3 | 8.50 | 14.0 | −6.00 | −6.00 |
| 4-4 | 8.50 | 14.0 | −2.50 | −2.50 |
| 4-5 | 8.50 | 14.0 | −2.75 | −2.75 |
| 4-6 | 8.60 | 14.0 | −1.00 | −1.00 |
| 4-7 | 8.50 | 14.0 | −1.00 | −1.00 |
| 4-8 | 8.50 | 14.0 | −1.00 | −1.00 |
| 4-9 | 8.55 | 14.1 | −1.25 | −1.25 |
| 4-10 | 8.50 | 14.1 | −1.25 | −1.25 |
| 4-11 | 8.50 | 14.0 | −1.25 | −1.25 |
| 4-12 | 8.50 | 14.1 | −3.00 | −3.00 |
| 4-13 | 8.40 | 14.0 | −7.00 | −7.00 |
| 4-14 | 8.45 | 14.1 | −7.00 | −7.00 |
| 4-15 | 8.50 | 14.0 | −7.00 | −7.00 |
| 4-16 | 8.50 | 14.0 | −1.50 | −1.50 |
| 4-17 | 8.50 | 14.0 | −1.75 | −1.75 |
| 4-18 | 8.55 | 14.0 | −1.25 | −1.50 |
| 4-19 | 8.50 | 14.1 | −1.25 | −1.50 |
| 4-20 | 8.50 | 14.0 | −1.75 | −1.75 |
| 4-21 | 8.55 | 14.1 | −3.25 | −3.25 |
| 4-22 | 8.60 | 14.0 | −1.75 | −1.75 |
| 4-23 | 8.60 | 14.0 | −2.50 | −2.50 |
| 4-24 | 8.50 | 14.1 | −2.75 | −2.75 |
| 4-25 | 8.50 | 14.1 | −3.00 | −3.00 |
| 4-26 | 8.50 | 14.0 | −3.25 | −3.25 |
| 4-27 | 8.55 | 14.0 | −2.50 | −2.50 |
| 4-28 | 8.50 | 14.0 | −3.00 | −3.00 |
| 4-29 | 8.50 | 14.0 | −2.75 | −2.75 |
| 4-30 | 8.50 | 14.0 | −3.00 | −3.25 |
| 4-31 | 8.50 | 14.0 | −3.50 | −5.75 |
| 4-32 | 8.50 | 14.1 | −5.75 | −5.75 |
| 4-33 | 8.50 | 14.0 | −3.25 | −3.50 |
| 4-34 | 8.50 | 14.0 | −3.50 | −3.50 |
| 4-35 | 8.30 | 14.1 | −4.00 | −4.25 |
| 4-36 | 8.50 | 14.0 | −4.50 | −4.50 |
| 4-37 | 8.45 | 14.0 | −3.75 | −4.00 |
| 4-38 | 8.20 | 14.1 | −4.00 | −4.25 |
| 4-39 | 8.50 | 14.1 | −4.00 | −4.00 |
| 4-40 | 8.50 | 14.0 | −4.25 | −4.50 |
| 4-41 | 8.40 | 14.0 | −5.50 | −5.50 |
| 4-42 | 8.40 | 14.0 | −4.25 | −4.50 |
| 4-43 | 8.35 | 14.0 | −3.75 | −3.75 |
| 4-44 | 8.40 | 14.0 | −3.25 | −3.50 |
| 4-45 | 8.30 | 14.1 | −3.75 | −3.75 |
| 4-46 | 8.45 | 14.0 | −4.50 | −4.75 |

TABLE 3

| # | Corrected Diopter P (Unit: D) | N (Unit: D) | M (Unit: D) | O (Unit: D) | N ± $\delta_1$ (Unit: D) | M ± $\delta_2$ (Unit: D) | O ± $\delta_3$ (Unit: D) |
|---|---|---|---|---|---|---|---|
| 1 | −2.0 | −1.5 | −2.5 | −2.0 | 0~−2.0 | −2.0~−3.0 | −1.5~−2.5 |
| 2 | −3.0 | −2.5 | −3.5 | −3.0 | −0.5~−3.25 | −3.25~−4.25 | −2.5~−3.5 |
| 3 | −4.0 | −3.25 | −4.5 | −4.0 | −1.0~−3.5 | −3.5~−5.5 | −3.5~−4.5 |
| 4 | −5.0 | −4.0 | −6.5 | −5.0 | −1.5~−5.5 | −5.5~−7.75 | −4.5~−5.5 |
| 5 | −6.0 | −4.25 | −7.5 | −6.0 | −2.25~−6.0 | −6.0~−9.5 | −5.5~−6.5 |
| 6 | −7.0 | −4.5 | −8.5 | −7.0 | −2.5~−6.5 | −6.5~−9.5 | −6.5~−7.5 |

TABLE 4-continued

| | BC | Dia | PWR | Target Value |
|---|---|---|---|---|
| 4-47 | 8.45 | 14.0 | −4.75 | −4.75 |
| 4-48 | 8.50 | 14.0 | −4.75 | −5.00 |
| 4-49 | 8.40 | 14.0 | −4.75 | −5.00 |
| 4-50 | 8.30 | 14.2 | −4.00 | −4.25 |
| 4-51 | 8.45 | 14.0 | −5.50 | −5.75 |
| 4-52 | 8.40 | 14.0 | −4.50 | −4.75 |
| 4-53 | 8.40 | 14.0 | −4.75 | −5.00 |
| 4-54 | 8.50 | 14.0 | −5.25 | −5.25 |
| 4-55 | 8.35 | 14.1 | −5.25 | −5.50 |
| 4-56 | 8.45 | 14.1 | −5.50 | −5.50 |
| 4-57 | 8.50 | 14.1 | −5.25 | −5.25 |
| 4-58 | 8.55 | 14.1 | −5.25 | −5.25 |
| 4-59 | 8.35 | 13.9 | −3.75 | −3.75 |
| 4-60 | 8.50 | 14.0 | −4.00 | −4.00 |
| 4-61 | 8.40 | 13.9 | −7.75 | −8.00 |
| 4-62 | 8.50 | 14.0 | −7.75 | −8.00 |
| 4-63 | 8.40 | 13.8 | −7.75 | −8.00 |
| 4-64 | 8.55 | 14.0 | −7.50 | −7.50 |
| 4-65 | 8.50 | 13.9 | −7.50 | −7.50 |
| 4-66 | 8.50 | 14.0 | −7.50 | −7.50 |

From the test values of Table 4, it is clear that the optical structure of the contact lens of this disclosure is substantially equivalent to the aspheric monofocal contact lens. Thus, the optical lens of this disclosure can indeed be used for correcting different visual acuities in diopters.

The present disclosure is currently conducting double blind and randomized clinical tests in Taipei Tzu Chi Hospital and National Taiwan University Hospital for wear of the optical lens 100 of this disclosure by different users. At present, it can be verified that the optical lens 100 of this disclosure can be used to correct vision, and will not produce the problem of image jump. Further, the diopter after fusion can indeed provide user correction of vision. Moreover, the clinical tests will verify whether further controlling of the myopia can be effected.

Figure 8:
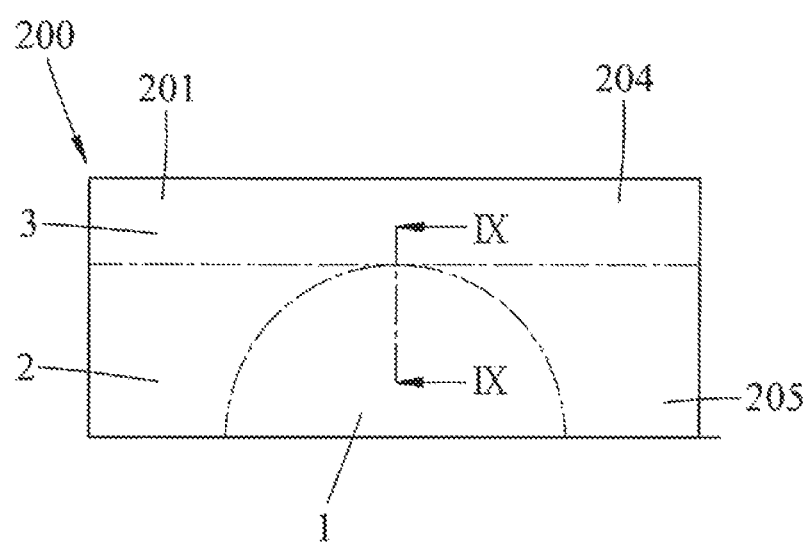
FIG. 8 is a schematic view of an optical lens for vision correction according to the second embodiment of this disclosure.
Figure 9:
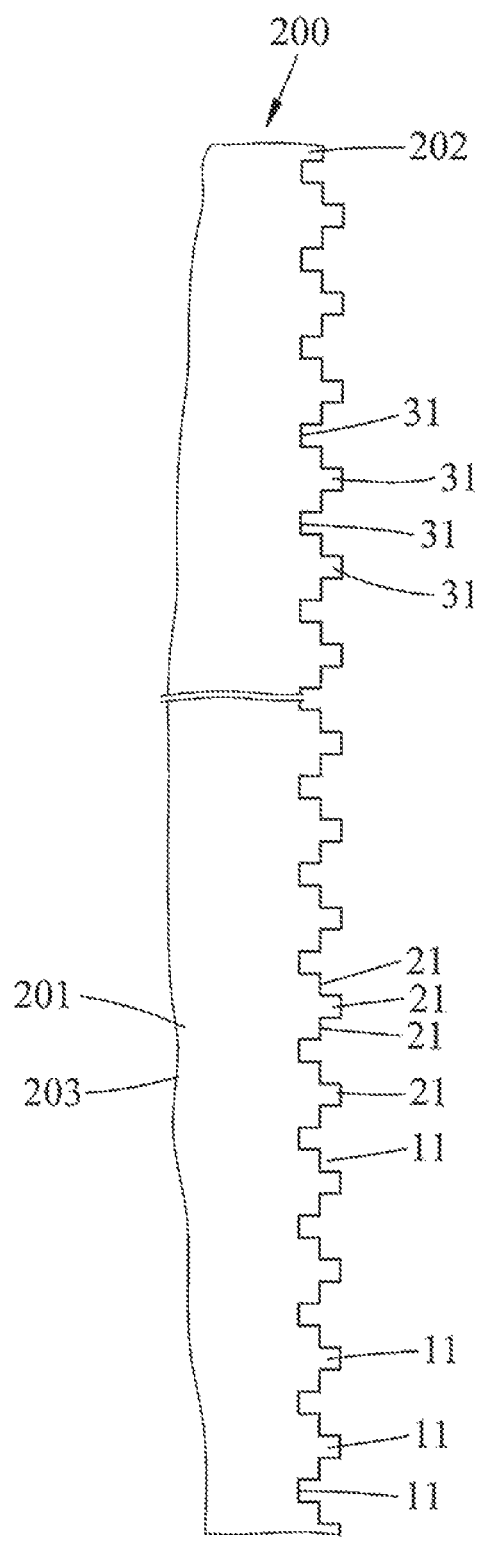
FIG. 9 is a sectional view taken along line IX-IX of FIG. 8.

Referring to FIGS. 8 and 9, the second embodiment of an optical lens 200 for vision correction according to the present disclosure is generally identical to the first embodiment, and differs in that the optical lens 200 of the second embodiment is an eyeglass lens. The optical lens 200 includes a lens body 201 having an inner side surface 202 proximate to the eye (E) (see FIG. 1), an outer side surface 203 opposite to the inner side surface 202, an upper part 204 between the inner and outer side surfaces 202, 203, and a lower part 205 opposite to the upper part 204. The first image fusion area 1 is located at the lower part 205, the second image fusion area 2 is adjacently connected to the first image fusion area 1, and the third image fusion area 3 is adjacently connected to the second image fusion area 2 and is located at the upper part 204. The first, second and third dioptric portions 11, 21, 31 are distributed around the inner side surface 202. However, they may also be distributed on the outer side surface 201, and should not be limited to what is disclosed herein. Thus, the effect and purpose of the first embodiment can be similarly achieved using the second embodiment.

In sum, by virtue of the absolute value of the first diopter |N| of the first image fusion area 1 being smaller than the absolute value of the desired corrected diopter |P|, by virtue of the changes in the diopters of the first and second dioptric portions 11, 21, and with the longest width (W11, W21) of each of the first and second dioptric portions 11, 21 relative to the visual axis (L) being preferably smaller than 200 nanometers, the optical lens 100, 200 for vision correction according to this disclosure can permit the human eye vision imaging system to form a visual imaging correction visible area (S) located on the retina. As such, the eye (E) can directly make adjustment when looking far or near, thereby minimizing the changes and compression deformations of the ciliary muscle and the lens due to looking far or near. Hence, the feeling of eye fatigue can be reduced. Moreover, the vision of the user can be constantly and stably controlled within the clear vision of external objects. Therefore, the object of this disclosure can indeed be achieved.

While the disclosure has been described in connection with what are considered the exemplary embodiments, it is understood that this disclosure is not limited to the disclosed embodiments but is intended to cover various arrangements included within the spirit and range of the broadest interpretation so as to encompass all such modifications and equivalent arrangements.

What is claimed is:

1. An optical lens for vision correction comprising:
    a first image fusion area centered on a visual axis (L) of the eye (E) of a user and including a plurality of first dioptric portions randomly arranged around said first image fusion area and fused to have a first diopter (N);
    a second image fusion area connected to and surrounding said first image fusion area, said second image fusion area including a plurality of second dioptric portions randomly arranged around said second image fusion area and fused to have a second diopter (M);
    a third image fusion area connected to and surrounding said second image fusion area, said third image fusion area including a plurality of third dioptric portions randomly arranged around said third image fusion area and fused to have a third diopter (O);
    wherein the absolute value of said first diopter |N| is smaller than the absolute value of said second diopter |M|, and the longest width of each of said first and second dioptric portions relative to the visual axis (L) is smaller than 200 nanometers; and
    wherein said optical lens is a contact lens, said first image fusion area has a radius ($r_1$) with respect to the visual axis (L) ranging from 1 mm to 2.5 mm, said second image fusion area has a radius ($r_2$) with respect to the visual axis (L) ranging from 1.5 mm to 4 mm, and said third image fusion area has a radius ($r_3$) with respect to the visual axis (L) ranging from 2 mm to 8 mm.

2. The optical lens as claimed in claim 1, wherein each of said first dioptric portions has a diopter of N±$\delta_1$, where $\delta_1$ is a variable value ranging from 0.25D to 9.0D, and each of said second dioptric portions has a diopter of M±$\delta_2$, where $\delta_2$ is a variable value ranging from 0.25D to 12.0D.

3. The optical lens as claimed in claim 1, wherein each of said third dioptric portions has a diopter of O±$\delta_3$, where $\delta_3$ is a variable value ranging from 0.25D to 12.0D, and said third diopter |O| ranges between said first diopter |N| and said second diopter |M|.

4. The optical lens as claimed in claim 1, further comprising an inner side surface configured to contact the eye (E), and an outer side surface opposite to said inner side surface, and wherein said first, second and third dioptric portions are distributed around one of said outer and inner side surfaces.

5. The optical lens as claimed in claim 1, wherein said optical lens is configured to be worn by a user in need of a vision correction in diopter (P), and wherein the absolute value of said first diopter |N| is smaller than the absolute value of the corrected diopter |P|, and the absolute value of said second diopter |M| is larger than the absolute value of the corrected diopter |P|.

* * * * *